Oct. 15, 1946.　　　M. L. DONNELLAN　　　2,409,552
AIRCRAFT PROPULSION DEVICE
Filed May 27, 1943　　　3 Sheets-Sheet 1
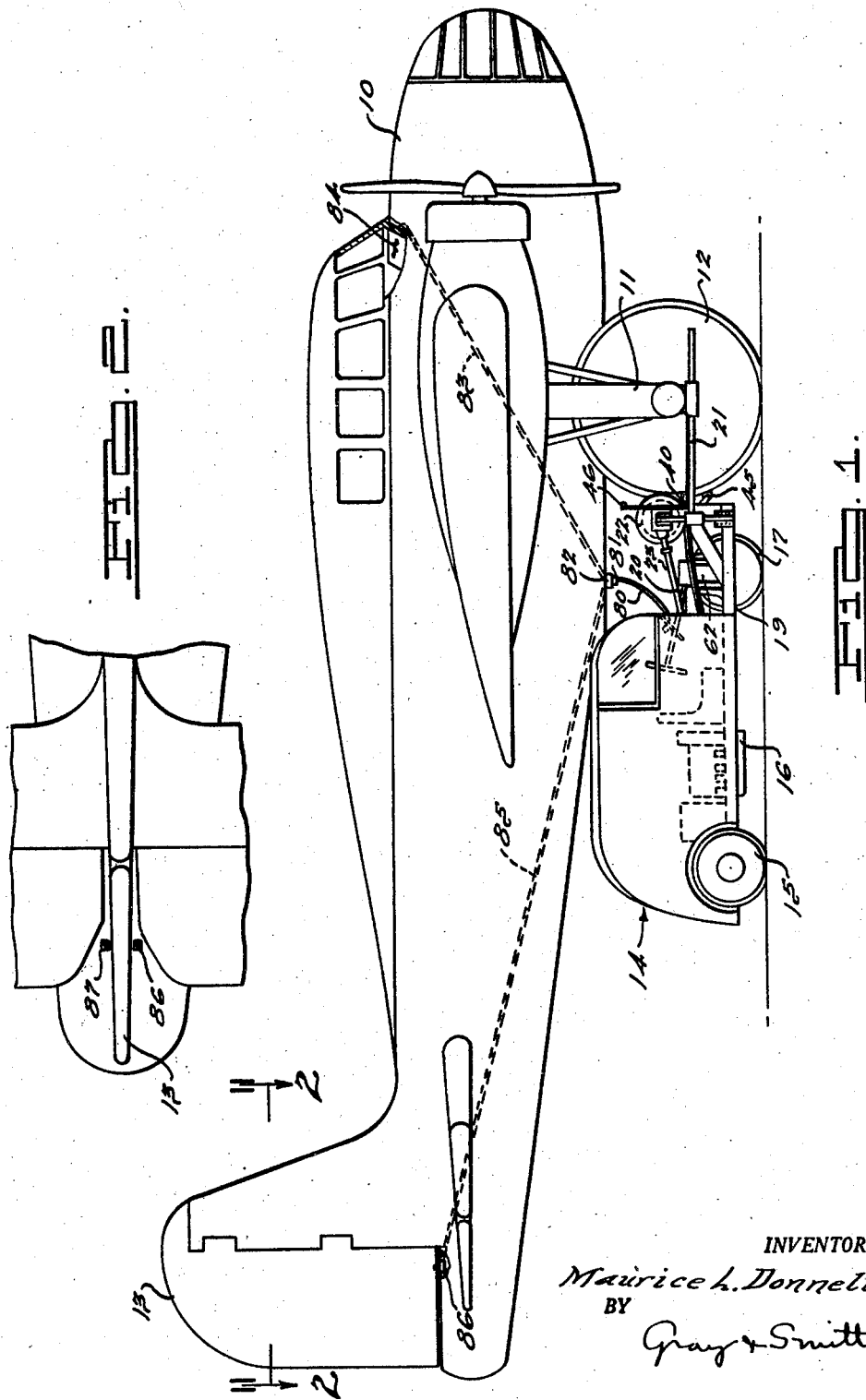
INVENTOR.
Maurice L. Donnellan.
BY
Gray & Smith Oct. 15, 1946.  M. L. DONNELLAN  2,409,552
AIRCRAFT PROPULSION DEVICE
Filed May 27, 1943  3 Sheets-Sheet 2

INVENTOR.
Maurice L. Donnellan.
BY
Gray & Smith

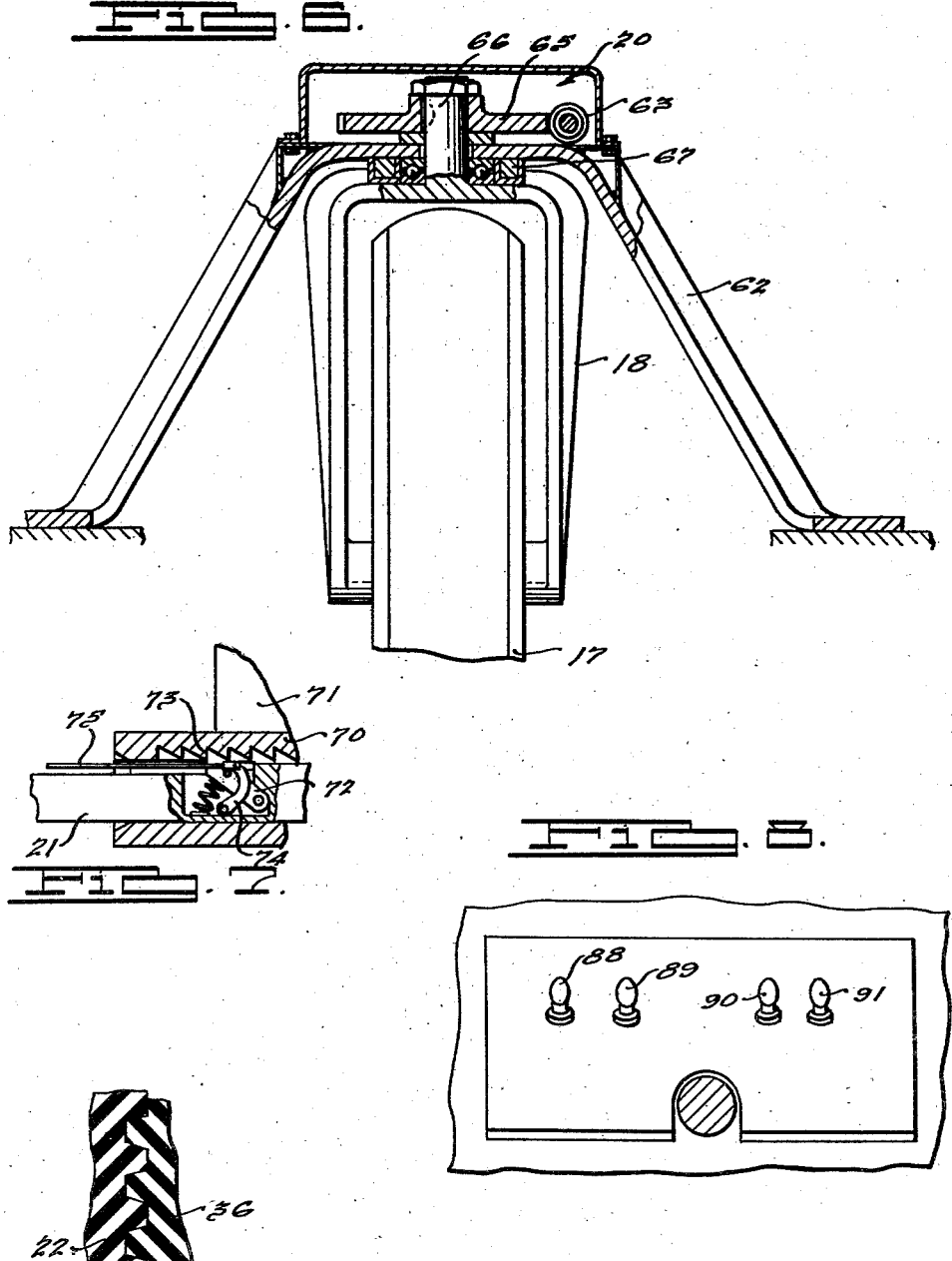

Patented Oct. 15, 1946

2,409,552

UNITED STATES PATENT OFFICE 2,409,552

AIRCRAFT PROPULSION DEVICE

Maurice L. Donnellan, Ypsilanti, Mich.

Application May 27, 1943, Serial No. 488,763

2 Claims. (Cl. 244—63)

The present invention relates to an aeronautical take-off device and more particularly to a device which is adapted to assist in the take-off of air borne vehicles. An air borne vehicle of the rigid wing type is least efficient mechanically during its take-off period. At this time the weight of the plane and its load is supported by the landing gear and the ground engaged wheels. In order to attain flight speed it is necessary to have the vehicle and its load rapidly accelerated in order to attain such speeds as to impart a lift to the wing. During the take-off period it usually is necessary to move the vehicle over a relatively great distance which requires the entire power output of the motors because of the excessive power demands during the take-off interval. As is known, actual flight of the vehicle when air borne requires considerably less than the entire power out-put of the motors.

It is, therefore, among the objects of the present invention:

1. To provide a novel aeronautical take-off device to furnish additional power to the plane during the take-off period.

2. To provide a novel aeronautical take-off device which may be readily attached to the plane while on the ground but which is detached from the plane as soon as take-off speeds are attained and the plane becomes air borne.

3. To provide a novel take-off device consisting of a vehicle having ground engaged wheels which are power driven independently of the motors of the aircraft, thus permitting relatively greater loads in the aircraft while permitting a take-off from a restricted area without requiring the use of additional motors on the plane itself.

4. To provide a device particularly adapted for handling and maneuvering ground borne aircraft and in which the power is efficiently applied directly to the ground contacting wheels of the aircraft.

5. To provide an aeronautical take-off device which will minimize the requirement of high lift characteristics of the wing and permit the design of wings having relatively higher speed characteristics without increasing the dimensions required in the take-off area.

6. To provide a novel aeronautical take-off device in which the horse power available for the take-off may be selectively increased as may be required to assure a proper take-off within the space and time interval available.

7. To provide a device to assist in the take-off of air borne vehicles, either of the power driven or the motorless glider types, either singly or in multiples, such for example as in trains.

8. To provide a device adapted to supply auxiliary power to a normally air-borne vehicle during the take-off and in which the power developed in the take-off device is transmitted efficiently directly to the wheels of the plane.

Other objects of this invention will appear in the following description and appended claims, reference being had to the accompanying drawings forming a part of this specification wherein like reference characters designate corresponding parts of the several views.

Fig. 1 is a view in side elevation showing an airplane with a take-off device of the present invention connected therewith, parts of the plane being broken away to show details of control mechanism used with the present invention.

Fig. 2 is a fragmentary top plan view taken substantially along the line 2—2 in the direction of the arrows in Fig. 1.

Fig. 6 is an enlarged fragmentary sectional view taken substantially along the line 6—6 looking in the direction of the arrows in Fig. 3.

Fig. 7 is an enlarged sectional detail of the attaching mechanism taken in the encircled area 7 of Fig. 4.

Fig. 8 is a fragmentary plan view taken substantially along the line 8—8 in the direction of the arrows of Fig. 3.

Fig. 9 is a fragmentary sectional view taken along the line 9—9 looking in the direction of the arrows of Fig. 3.

Figure 3:
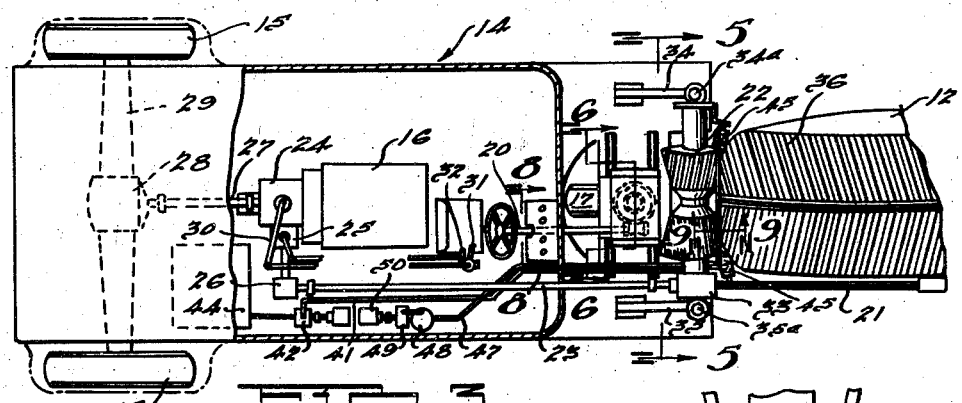
Fig. 3 is a top plan view with sides broken away and partially in section showing a take-off device embodying the present invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the preferred embodiment of the present invention, I propose to utilize a power driven take-off device on each of the ground engaging landing wheels of the airplane and to synchronize their operation as will hereinafter be more fully described. In order to simplify the drawings and the description of the invention, it will be described with reference to but one take-off device arranged for driving one of the ground engaging wheels of the airplane, it being understood that the other units which engage the other ground engaging wheels of the airplane will be identical in construction and operation with that to be hereinafter described. It is also to be understood that it is within the scope of the present invention to utilize but a single take-off device of the present invention and by the provision of a plurality of spaced driving heads to drive more than one of the ground engaging wheels of the plane at one time.

Referring to the drawings, and particularly to Fig. 1, 10 designates an airplane of conventional design, which is provided with a landing gear 11 which carries a plurality of ground engaging wheels 12, one of which only is shown in the drawings. A vertically pivoted rudder 13 is provided to control the movement of the plane horizontally, the rudder being controlled by the pilot of the plane in accordance with conventional practice and construction.

The take-off device of the present invention is indicated in general by the numeral 14 and is provided with a pair of ground engaging drive wheels 15, operatively connected and power driven by a suitable source of power 16, such for example as an internal combustion engine, a Diesel engine, a gas-electric drive, or the like. The take-off device 14 is guided by manipulation of front steering wheels or, preferably the single steering wheel 17, which is mounted in forks 18 (see Fig. 6) which are pivotally connected as will be hereinafter more fully described, with the frame 19. While the single wheel has definite advantages as to maneuverability, it is to be understood that a pair of steering wheels may be used in accordance with any desired conventional design or construction.

Steering movement of the wheel 17 is effected by a manually controlled steering gear 20, when the device is disconnected from the plane. When connected with the plane, the take-off device 14 is guided by the steering arm 21.

Power is transmitted from the take-off device 14 to the plane wheel 12 by a power driven gear member 22, which is connected by suitable gearing with a power driven shaft 23, which is operatively connected for the transmission of driving torque to the power source 16. The driven gear member 22 is preferably a solid member provided with resilient gear teeth, as shown. If desired, however, it may have rigid gear teeth, or it may be a pneumatic tire member mounted on a wheel secured to an axle. As shown in Fig. 3 the power source 16 is connected with a transmission 24 having a power take-off 25 which is connected through bevel gearing 26 to drive the shaft 23. A shaft 27 is driven from the transmission 24 and transmits driving torque through a conventional type of differential 28 to the power driven axle 29, which drives the ground engaging driving wheels 15. Control and shifting mechanism 30 is provided for selectively declutching or driving the wheels 15 and is controlled from a shift control 31 which is placed adjacent the operator's seat in the device. A shift control 32 also placed adjacent the operator's seat in the device controls the selective declutching or driving of the power take-off shaft 23 and the gear member 22. The driving torque of the shaft 23 is transmitted through bevel gears 33 to the member 22 and drives the ground engaging wheel 12 of the plane.

The driving member 22 is mounted on a shaft carried by pivotally mounted arms 34 and 35, which are provided with vertical adjusting members 34—A and 35—A by means of which either end of the shaft may be raised or lowered independently of the other end by the pivoting of the arm 34 and 35. By this provision the angular relation of the driving member 22 to the ground engaging wheel 12 of the plane may be varied so as to compensate for the camber and caster of the wheel 12. In this way an aligned meshing of the gear teeth on the member 22 with the ribbed portions of the tread 36 on the wheel 12 is effected as shown in greater detail in Fig. 9.

This provides a positive power drive from the member 22 to the wheel 12.

In order to assure the accurate meshing of the ribbed portion of the driving member 22 with the ribbed portion of the tread 36, means are provided for removing accumulations of earth, stones, and the like or similar substances from the spaces between the resilient ribbed portions of the tread 36. In a preferred embodiment of the invention, I provide jets 40 of a high velocity fluid, such as water, which are supplied with such fluid under pressure through a fluid supply line 41, which is connected with a pressure pump 42 driven by a motor 43, and supplied with the fluid from a fluid supply tank 44. Where the tread of the tire 12 is of rubber and the driving member 22 has gear teeth members also of rubber of suitable hardness to transmit a drive from one member to the other, the use of water either with or without a soapy lubricant is preferred for this purpose as this also lubricates the resilient gearing during the driving engagement of the member 22 and the tread 36.

In order to assure a cleaning of the spaces between the ribbed portion of the tread 36, a rotary brush 45 is provided which contacts the tread 36 and mechanically removes the greater part of the material accumulated between the ribbed portions of the tread so that the subsequent flushing with the fluid under pressure is effective to clean thoroughly the spaces between the ribbed portions of the tread 36. If it is desired to cool the tread 36 after the driving engagement with the member 22, a plurality of air jets 46 are provided for playing on the tread 36, and these jets are supplied with air under pressure from an air supply line 47 which is operatively connected with a compressed air tank 48 which is supplied with compressed air by an air compressor 49 which is driven by a motor 50.

If desired, however, either the fluid or the air or both may be dispensed with under certain operating conditions, and also may be reversed as to their point of discharge relative to the tread 36 of the wheel 12.

The transfer of power to drive the wheel 12 is effected through a power head which preferably includes the resiliently toothed member 22, having ribs which mesh directly with the resilient rib construction on the tread 36. Alignment of the driving member 22 relatively to the tread 36 is facilitated and the member 22 is guided by means of a circumferential rib 51, which is provided on the tire 36 and which extends vertically above the plane of the angular ribs 52. A central cut-away or beveled portion 53 is preferably provided on the member 22 for engagement of the rib 51. While the present drawings show the use of but one power head on a take-off device 14, it is to be understood that a plurality of spaced power heads may be provided, one adjacent each of the ground engaging wheels of the plane for driving such wheels, or one or more adjacent each wheel.

Figure 4:
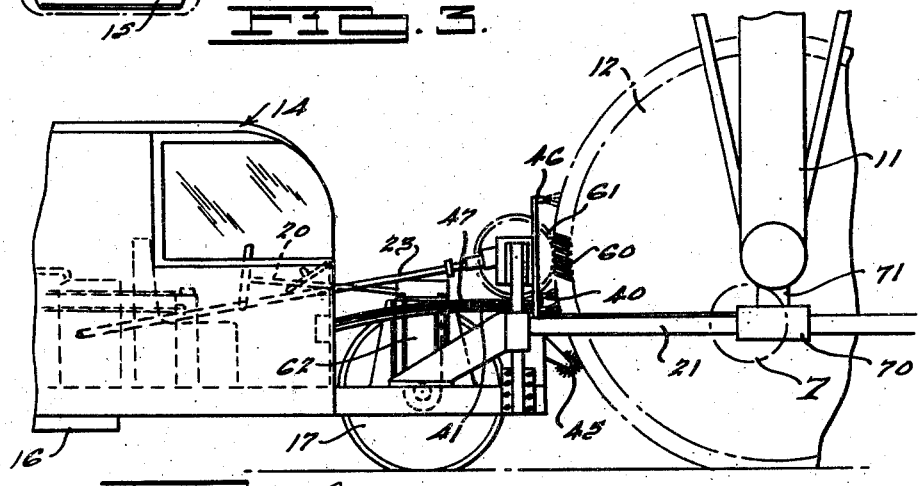
Fig. 4 is an enlarged fragmentary side elevation of the take-off device embodying the present invention.
Figure 5:
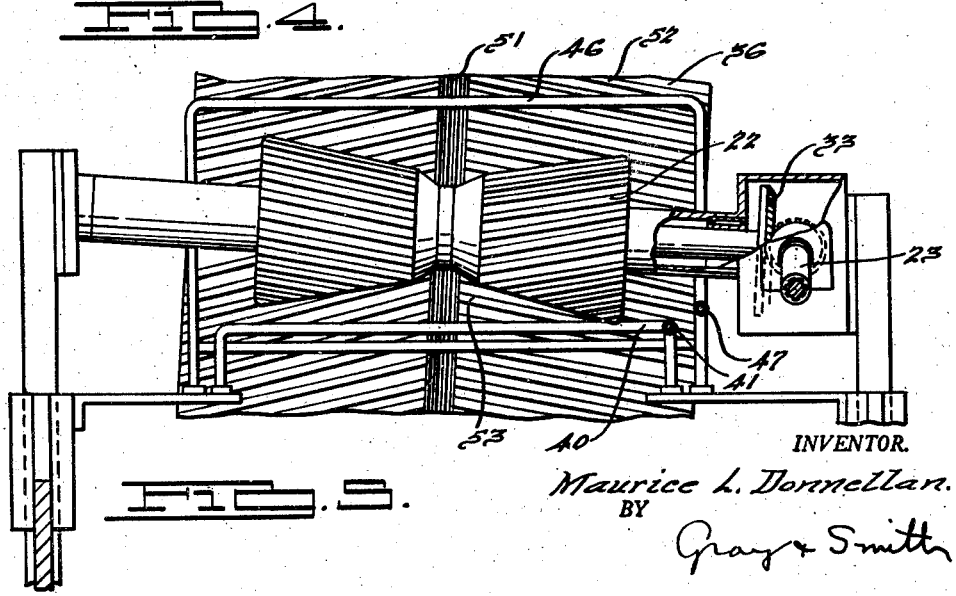
Fig. 5 is an enlarged sectional view taken substantially along the line 5—5 looking in the direction of the arrows in Fig. 3.

If a more positive drive is desired, a modified form of power head may be employed, such for example as that shown in Fig. 4. As here shown, a spiral gear 60 is mounted on the wheel 12 and is driven by a toothed gear 61, which is carried in the power head portion of the take-off device 14, as a substitute for the member 22. Otherwise the construction of the power head and its operation is substantially the same as that previously described.

A further modification is within the contemplation of the present invention and includes a toothed gear mounted on the wheel 12, which may be of any desired type of gear design. A driven gear is mounted on a gear bracket with its teeth in mesh with the teeth of the said gear. This portion of the unit would remain on the airplane and the power head provided in the take-off gear 14 would consist only of a splined shaft which would mesh with the said drive gear and would be selectively attached to or detached from driving relation with said gear as might be desired in the operation of the device.

As shown in Fig. 6, the steering wheel 17 of the power take-off device 14 of the present invention preferably is mounted in forks 18 which are pivotally mounted in a bracket 62 which is secured at its ends to the frame 19. As shown in Figs. 1 and 4, the steering gear 20 comprises a worm gear 63 secured to the steering post 64 and rotated therewith. A toothed gear segment 65 is locked to the stub shaft 66 which is secured to the forks 18. The toothed gear 65 meshes with the worm gear 63. Thus upon rotation of the worm gear 63 the forks 18 are rotated and the wheel 17 is directed as may be desired. When the take-off device 14 is connected with the plane as shown in Figs. 1, 3 and 4, the steering movement of the wheel 17 is controlled by the steering arm 21 which controls the movement of the forks 18.

The arm 21 is provided with a forked end 67 which engages the forks 18. The arm 21 is detachably connected with the internally toothed sleeve 70 carried on a bracket 71 secured to the plane landing gear 11. Angular movement of the landing gear 11 relative to the power take-off device 14 causes a swinging movement of the arm 21, which effects a rotation of the forks and the movement of the steering wheel 17 as may be required to direct the take-off device 14 in such a direction as to maintain an aligned driving relation with the wheel 12 of the airplane. If desired an over-running clutch of any conventional design (not shown) may be provided for connecting the forks 18 and the stub shaft 66 so that movement of the forks 18 by the steering arm 21 would be accommodated by such a clutch and not be transmitted rearwardly through the steering gear mechanism.

The steering arm 21 also provides the means for detachably connecting the take-off device 14 with the landing gear 11 of the plane as shown in Figs. 4 and 7. As here shown an internally toothed sleeve 70 is secured to a bracket 71 which is carried by the landing gear. As shown in Fig. 7 the end of the arm 21 is provided with a spring pressed ratchet locking dog 72, which engages with ratchet teeth 73 which are provided inside the sleeve 70 and prevents an unintended disconnection of the plane and the take-off device. A pivotally mounted control member 74 is adapted to control the locking and unlocking of the dog 72 and the ratchet teeth 73. The control member 74 is controlled by a control rod 75, which extends into the cab of the take-off device 14, and is manually actuated by the operator of the take-off device when it is desired to disconnect the take-off device from the plane or to hold the locking dog 72 in a withdrawn position during the coupling of the device 14 to the sleeve 70 carried by the landing gear.

Disconnection of the steering arm 21 is effected by actuation of the pivotally mounted control member 74 so as to disengage the locking dog 72 from the ratchet teeth 73. This permits the sleeve 70 to be drawn away from the end of the arm 21 and disconnects the plane and the take-off device.

In order to synchronize the operation of the take-off devices 14 an electrical signalling system is provided which is controlled from the plane and transmits visible signals to the operators of the power driven take-off units. An electrically conductive cable 80 is provided on each take-off device and has a quick-detachable plug 81 connected with a receptacle 82 carried on the plane. The receptacles are electrically connected by electrically conductive cables 83 with a control 84 on the plane instrument panel and are connected by an electrically conductive cable 85 with the electrical switch members 86 and 87 disposed respectively, one on each side of the movable rudder 13.

The control 84 operates a "stop"-lamp signal 88 and a "go"-lamp signal 89, which are provided on the dash of each of the take-off vehicles (Fig. 8). Thus the pilot of the plane, by operation of the control 84 can signal the operators of each of the take-off vehicles 14 when to "stop" and when to "go."

The switch members 86 and 87 are connected with an amber lamp signal 90 to call for a retarding of the speed of the take-off device 14 and with a green signal lamp 91 to call for accelerating the speed of the take-off device 14. The signals are synchronized in such a way in the take-off devices that when the plane's rudder 13 is moved to cause the plane to move to the right, an amber signal is flashed to the operator of the take-off device 14 which is driving the right wheel and a green signal is flashed to the operator of the take-off device 14 on the left wheel. This results in a speeding up of the left wheel with relation to the driving of the right wheel and this causes the plane to move to the right. When movement to the left is desired, the amber signal lamp flashes in the take-off device 14 driving the left wheel, and the green signal lamp flashes on the dash of the take-off device operating on the right wheel. This causes the plane to move to the left.

The present application is related to my co-pending applications Serial Nos. 483,612 and 483,613 but differs from the device as shown in said applications in that in all embodiments of the present invention a power drive is applied directly to the ground engaging wheels of the airplane and the take-off devices 14 are but an auxiliary power source.

If desired the power driven wheels 15 of the take-off device 14 may be power driven by the motor 16 during the driving of the wheel 12, but the preferred operation is to use the power driving of the wheels 15 solely for the maneuvering of the take-off devices 14 into driving position with relation to the ground engaging wheels 12. After the connection of the device is effected by means of the steering arm 21, the drive to the power driven wheels 15 is disconnected by actuation of the control member 31 and the declutching member 30. At the same time the control member 32 is actuated so as to provide a power drive of the driving member 22. Thus the take-off device 14 is in effect towed by the plane and all of the power from the power source 16 is transmitted directly to the tread of the ground engaging wheels 12.

If desired a plurality of connecting arms 21 may be provided to secure a more positive alignment of the power driving member carried by the power head of the take-off device 14 with the tread portion of the ground engaging wheels 12 of the plane.

If desired, however, the wheels 15 may be power driven and exert a push either on the wheels or the axle of the landing gear of the plane. This may be accomplished by the use of any suitable type of push rod, yoke or fork secured to the take-off device 14 and having an end portion adapted for contacting a portion of the wheel or axle of the plane's landing gear.

Also it is to be understood that various types of mechanical connector and disconnector devices may be used to provide the means for accomplishing the connection and disconnection of the steering arms 21 with the airplane. Also it is to be understood that other types of signalling devices than those herein disclosed may be employed. For example, a suitable radio or telephonic connection may be established between the plane and the take-off devices which would assure proper control of the take-off devices during the take-off of the airplane.

By the present invention it will be seen that means are provided to secure an effective and efficient transfer of driving torque directly to the ground engaging wheels of the plane from auxiliary power units not directly carried by the plane. This provides a very efficient way in which to supply power to the plane so that the plane and its load are rapidly accelerated to take off speeds by the direct application of power to the ground engaging wheels. This additional power is readily available without increasing appreciably the weight of the landing gear or of the airplane and without requiring the use of permanently installed additional power units in the airplane.

Devices of the present nature are particularly useful for the assisting in the take-off of large airplanes from restricted areas. The currently proposed "sea-dromes" which are floating steel landing fields anchored at suitable positions in the ocean, are designed to facilitate the use of large cargo and passenger carrying planes for trans-oceanic travel. Such "sea-dromes" are of necessity of limited dimension and devices such as that herein disclosed would be very useful in assisting in the take-off of large heavily loaded planes from the restricted areas of such "sea-dromes." While use of such devices on a "sea-drome" is a spectacular and timely instance of uses for the device of the present invention, it is to be understood that the device is applicable generally to assist in the take-off of large heavily loaded airplanes from any take-off area of restricted dimensions.

It is also to be understood that one or more of the steering arms 21 may be used either alone or in combination with a towing arm the function of which would be that of towing the take-off device 14 from the plane. Any desired combination of steering arms and towing arms may be used within the contemplation of the present invention. Such a combination would be of particular value where a positive gear drive is employed for driving the ground engaging wheel of the airplane.

It is also to be understood that any desired number of driving members 22 may be employed for driving the wheel 12. The use of combinations of two, four or six small driving wheels which may be located at spaced points on the tread of the wheel 12 is desirable under certain conditions. By the application of power to such small driving wheels, the larger wheel would be rotated evenly by power applied at such spaced points and the take-off device 14 would be more definitely aligned therewith. The provision of the spaced driving wheels also would assure the transmission of the driving torque over a larger surface area than is the case where a single driving member is employed.

While I have shown conventional types of gear mechanisms for the transmission of power from the source of power 16 to the various points for power application, it is to be understood that any desired type of power transmitting device may be employed instead of positive gear devices. For example the power unit 16 may be connected with a suitable hydraulic unit and the transmission of power to the various power driven portions of the device may be effected by suitable hydraulic power lines and torque converting devices. Also the power unit 16 may be directly connected with an electric generating device and the power transmitted by suitable electric wiring directly to electric motors which are located at the points where power application is desired. All such means of transmitting power are within the purview and scope of the present invention.

I claim:

1. A take-off device to assist in the horizontal take-off movement of airplanes and comprising in combination a frame, a plurality of power driven wheels, a steerable wheel, a steering arm attached to said device for steering said steerable wheel, a power head, and a power source, means for selectively driving said power driven wheels and said power head from said power source, means for effecting a positive driving connection between said power head and a landing wheel of an airplane, and comprising a power driven toothed gear member driven by the power source and meshed in driving relation with gear tooth members provided on the landing wheel of an airplane, and quick detachable means for selectively coupling and uncoupling said steering arm and the airplane landing gear.

2. A quickly detachable power driven take-off device to assist in the horizontal take-off movement of an airplane, said device comprising a frame, a plurality of power driven wheels secured at one end of said frame, a single steerable wheel mounted in a fork pivotally mounted on the opposite end of said frame, a power source, a power head mounted on said frame adjacent said steering wheel and means for operatively connecting said power driven wheels and said power head with said power source, means for effecting a positive driving connection between said power head and a landing wheel of an airplane, a steering arm connected with said fork, a quick detachable coupling on the airplane landing gear for selectively coupling and uncoupling said arm and the airplane landing gear, said steering arm when coupled in said coupling being adapted to steer said steerable wheel and maintain a predetermined alignment of said take-off device and the airplane landing wheel at all times during the take-off movement of the airplane.

MAURICE L. DONNELLAN.